United States Patent [19]

Frigo

[11] Patent Number: 5,521,734
[45] Date of Patent: May 28, 1996

[54] ONE-DIMENSIONAL OPTICAL DATA ARRAYS IMPLEMENTED WITHIN OPTICAL NETWORKS

[75] Inventor: Nicholas J. Frigo, Atlantic Highlands, N.J.

[73] Assignee: AT&T Corp., Murray Hill, N.J.

[21] Appl. No.: 366,954

[22] Filed: Dec. 30, 1994

[51] Int. Cl.$^6$ .................................................. H04B 10/00
[52] U.S. Cl. .......................... 359/152; 359/167; 359/125; 359/114
[58] Field of Search ........................... 359/113–114, 125, 359/137, 143, 152, 167, 173, 174, 179

[56] References Cited

U.S. PATENT DOCUMENTS

| | | | |
|---|---|---|---|
| 4,399,563 | 8/1983 | Greenberg | 359/113 |
| 4,764,981 | 8/1988 | Miyahara et al. | 359/143 |
| 5,119,223 | 9/1990 | Panzer et al. | 359/123 |
| 5,241,409 | 8/1991 | Hill et al. | 359/128 |
| 5,272,556 | 11/1991 | Faulkner et al. | 359/125 |
| 5,285,305 | 12/1991 | Cohen et al. | 359/110 |
| 5,349,461 | 9/1994 | Huynh et al. | 359/152 |

OTHER PUBLICATIONS

Electronic Letters "Use of a Fibre Loop Reflector as Downstream Receiver and Upstream Modulator" vol. 26, No. 6, pp. 827–828, 7th Jun. 1990.

Photonics Technology Letters, "Integrated Optics NxN Multiplexer on Silicon", Oct. 1991, vol. 3, No. 10.
Electronic Letters "Experimental Demonstration of a Passive Optical Subscriber Loop Architecture" vol. 24, No. 6, pp. 344–345.
Electronic Letters "Led Spectral Slicing for Single–Mode Local Loop Applications" vol. 24, No. 7, pp. 389–390.
Electronic Letters "Passive Optical Local Networks for Telephony Applications and Beyond" vol. 23, No. 24, pp. 1255–1257, 19th Nov. 1987.
Proc 2 Annu Broadband Expo 14 Fiber Opt Comm Local Area Network Expo Broad Band 90. "Bi–Directional Broadband Local Network Evolution" pp. 314–318, Sep. 24–28, 1990.
BT Technical Journal Apr. 1993, "Inpact of New Optical Technology on Spectrally–Sliced" pp. 46–55.

Primary Examiner—Leo Boudreau
Assistant Examiner—Kinfe-Michael Negash

[57] ABSTRACT

An optical network is provided at a lowered cost and improved data throughput due to adoption herein of laser and receiver arrays in lieu of discrete transmitters and receivers. The arrays are referred to as one-dimensional optical data arrays. Preferably, the network includes optical network units that return a portion of the signals they receive in a looped-back mode. The returned portion, which may or may not be remodulated at the optical network unit, acts as a substantially continuous test to verify the optical integrity of the system.

18 Claims, 8 Drawing Sheets

ONE-DIMENSIONAL OPTICAL DATA ARRAYS IMPLEMENTED WITHIN OPTICAL NETWORKS

BACKGROUND OF THE INVENTION

1. Field of the Invention

The present invention relates to the use of one-dimensional optical data arrays within optical networks.

2. Description of the Related Art

Fiber optics technology has completely penetrated the long-haul telephony network due to its inherent low loss and high bandwidth. In the area of local loop applications, however, financially attractive options have developed more slowly. As of late, substantial research effort has been directed towards developing technology to implement fiber optics within local loop applications (e.g., fiber in the loop). Cost, capacity, and switching problems, however, still must be overcome.

The active double star is an example of fiber optics technology implemented within the local loop. As shown in FIG. 1A, an active double star 10 employs sets of transmitters and receivers $T_1, R_1, \ldots T_N, R_N$, at a central office 20, which transmit and receive downstream and upstream optical signals, respectively, via optical fibers $25_D$, $25_U$. The central office and fibers act as a primary star. Each optical fiber $25_D$, $25_U$, is linked to a remote terminal 30, where downstream-directed optical signals are terminated at a receiver R' and then processed (switched) electronically. Downstream optical signals are demultiplexed, re-formed, and launched from transmitters $T_1$' within fibers $35_D$ to a plurality of optical network units (ONUs) 40 forming a secondary star.

Alternatively, conventional passive optical networks 10' utilize passive optical couplers 32, as shown in FIG. 1B. The passive coupler 32 is located at a remote node 30' to direct downstream optical signals launched from a transmitter 14 at the central office 20. In a passive time division multiplexing or subcarrier multiplexing schemes, optical signals are sent to remote nodes 30' forming the primary star. Each remote node distributes its received optical signal passively, directing similar portions to each of a plurality of optical network units 40 along fibers $35_D$ to form a secondary star. Filtering means 42 contained at each optical network unit 40 extracts an intended portion of the received signal. During upstream communication, each optical network unit transmits an optical signal within a prearranged time slot or frequency on upstream fiber $35_U$. The upstream signals are received at the remote node 30', multiplexed, and directed therefrom to a receiver 16 at the central office 15 via fiber $25_U$.

Timing and power budget throughput problems are inherent within PONs operating according to this broadcast distribution. The problems may be avoided, however, utilizing switching methods such as wavelength division multiplexing. A PON network 10" which utilizes wavelength division multiplexing is shown in FIG. 1C. Therein, each transmitter 14' at the central office 20 modulates downstream data at N distinct wavelengths, multiplexing the modulated data signals and transmitting the multiplexed signals onto downstream feeder fibers $25_D$. Each feeder fiber $25_D$ carries the multiplexed signals to an input port $P_D$ of a WDM coupler 32' at remote node 30" for demultiplexing. The demultiplexed signals are passively directed by the WDM coupler to various output ports $P_D$' according to wavelength. The output ports direct the signals along downstream fibers $35_D$ to optical network units 40'. Signals are generated at and transmitted upstream from each optical network unit along fibers $35_U$. Said upstream signals are received at ports $P_U$', multiplexed within coupler 32', directed to port Pu and fiber $25_U$ for delivery to the central office. In many PONs, "U" and "D" refer to the same fibers and the same ports.

Remote Interrogation of Terminal Equipment, or RITE-Net™, is an emerging passive, WDM-based optical network technology that is disclosed in commonly owned copending U.S. patent application Ser. No. 08/029,724, filed Mar. 1, 1993, and incorporated herein by reference. A RITE-Net™ system 10''' is shown in FIG. 1D, includes a transmitter 14'' and receiver 16'' at the central office 20. The transmitter, typically a laser, transmits downstream information, according to wavelength, to a "Dragone" router[1] hereinafter referred to interchangeably as a wavelength division multiplexer/router (WDM/R) 32'' or waveguide grating router (WGR) located at remote node 30'''.

[1] Dragone et al. Integrated Optics N×N Muliplexer On Silicon, IEEE Photon. Technol. Lett., 3, pp. 896–899 (1991); Zirngibl et al., A 12-Frequency WDM Laser Source Based On a Transmissive Waveguide Grating Router, Electronics Letter (1994)

The WDM/R 32'' splits optical signals received thereat and directs the split signals to individual optical network units 40'' according to wavelength. The optical network units return a portion of the received signal (via upstream fiber 350 after first overmodulating it with optical dam. This avoids the need (and cost) for separate transmitters at each optical network unit and the difficulty of registering and tracking the wavelength of said transmitters. At the remote node 30''', the WDM/R 32'' multiplexes the overmodulated upstream signals and directs them via port $P_U$ and fiber $25_U$, to the central office.

SUMMARY OF THE INVENTION

An optical network of the present invention utilizes one dimensional optical dam arrays for multi-channel optical dam transmission and processing. Optical data arrays are linear arrays of optical transmitters or optical receivers, usually fabricated to serve as optical data links. Each element (e.g., laser or receiver) within an optical data array is independent, but driven concurrently with the other elements in the array. Because the optical data may be transmitted/received by/from N optical fibers instead of 1, the electronic and optical requirements for driving the optical data over the N fibers are inherently less stringent than that for driving one fiber with N times the bandwidth or throughput.

Each optical data array requires only one fixturing operation to affix a fiber array for the N channels (instead of N operations for N individual components) resulting in lower cost per component. Additionally, the electronics driving the N elements of the array may operate at a small fraction, i.e., approximately 1/N, of the total throughput rate. In other words, for example, instead of transmitting data along one fiber at 1 Gb/s, the same information may be transmitted along twenty fibers within a system at 50 Mb/s, utilizing arrays of 20 transmitters and arrays of 20 receivers. The much lower clock rate requires lower cost processing electronics as compared to those electronics needed for the higher rate.

In a preferred form, the optical data arrays described herein are implemented within an active network, preferably an active double star. Use of optical data arrays of this invention, however, is not limited to active networks, but may be implemented within various network designs according to the needs of those skilled in the art. Further, while RITE-Net™ optical network units are typically associated with passive networks, they may be utilized, as described herein, within active networks.

An optical network of this invention may also provide for substantially continuous and time efficient integrity testing of the optical transmission paths between a remote terminal and each system subscriber, i.e., optical network unit. The resources required to implement prior art integrity testing of each system subscriber's line are thereby minimized. This reduces the cost for system maintenance while increasing the system's reliability and maintainability.

The integrity testing described herein is implementable in a design where each optical network unit is interrogated during normal operation, as exemplified by RITE-Net™ systems. More particularly, the means used to return a portion of an optical signal received at each optical network unit is concurrently utilized to provide the integrity check. Further, because the looped-back (returned) portions of the optical signals launched from a remote terminal, e.g., a one dimensional optical dam array, realize minimal attenuation, sensitivity requirements for receivers utilized within the network are minimized, further lending to reduced system cost.

DETAILED DESCRIPTION OF THE PREFERRED EMBODIMENT

One of the main impediments to the introduction of fiber optic communications to local subscribers within telephony networks is the cost. In an effort to control system cost, this invention implements one-dimensional optical data arrays within an optical network to transmit and/or receive optical data along independent optical links synchronously or plesiosynchronously. Consequently, data may be transmitted to each of N receiver elements within an optical receiver array along N fibers at lower rates, i.e., 1/N, of the maximum rate in lieu of transmission via one optical fiber at a high rate. Such operation obviates the need for a multiplicity of high speed processing electronics at the remote terminals. While one-dimensional optical data arrays of transmitters and/or receivers are known to be used within high speed computers to provide optical interconnects, their use within FITL optical networks is novel, and leads to improved and reduced-cost optical-network operation.

Figure 2:
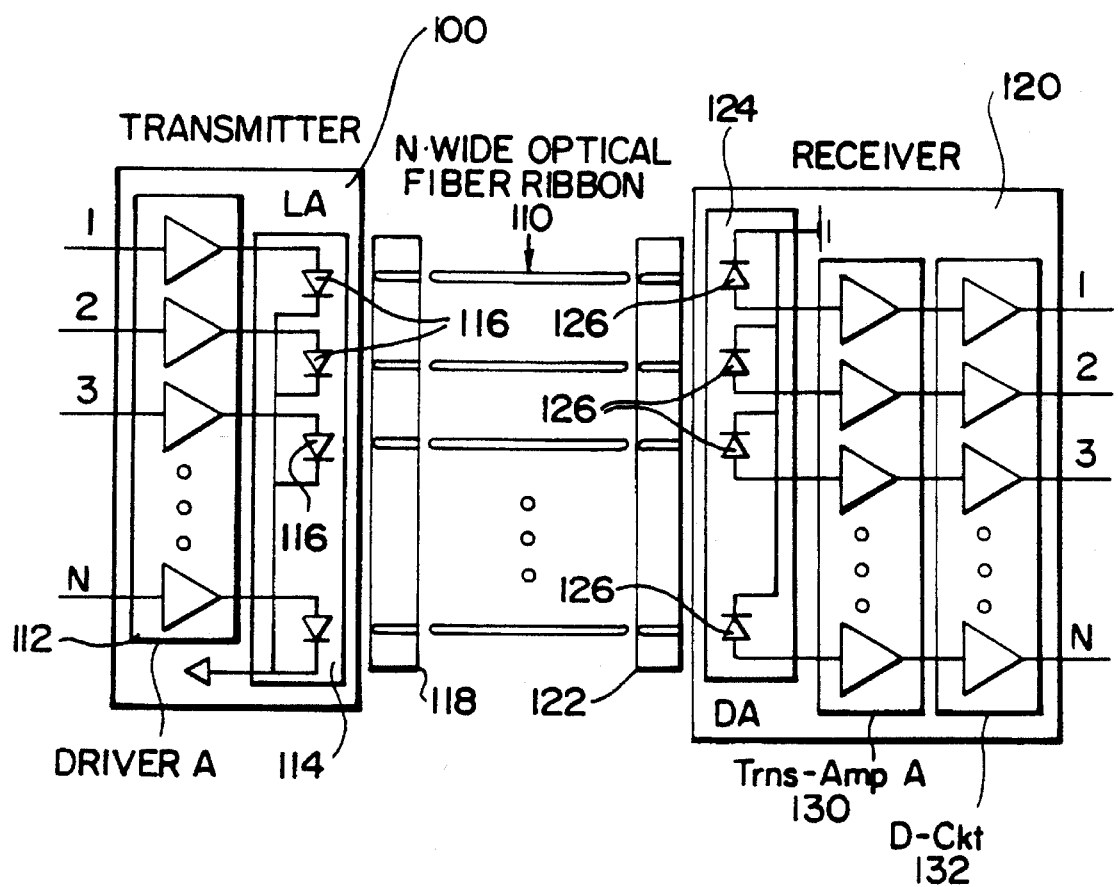
FIG. 2 is a schematic diagram depicting a one-dimensional optical data array.

The one-dimensional optical data arrays may be implemented within active networks that implement RITE-Net™ type communication between remote terminals and optical network units. Consequently, system cost, i.e., system maintenance and reliability cost, may be further reduced where the system's inherent communication characteristic is utilized in integrity testing (to be discussed in greater detail below). The need, therefore, to implement conventional electronics, e.g., optical time domain reflectometry (OTDR), within the system to merely confirm the integrity of each separate subscriber loop is minimized. FIG. 2 depicts an implementation of a one-dimensional optical data array of this invention. The depiction is given for illustration purposes only and is not meant to limit the scope of the invention. In the figure, a one-dimensional optical transmitter array 100 is shown optically linked via an optical ribbon 110 to a one-dimensional optical receiver array 120. Transmitter array 100 includes a driver circuit 112 for driving a set 114 of N lasers or like devices 116. The output from each of the N lasers devices is coupled to each of the N parallel optical fibers comprising ribbon 110 via a connector 118, e.g., a MAC II connecter, manufactured by AT&T Corporation. The downstream ends of the fibers are coupled through a second connector 122 to each of a set 124 of optical detectors 126 within receiver array 120. The detected signals are amplified within an array 130 of amplifiers and transferred to an array of decision circuits and line drivers 132. At this point in the dam flow, the dam may be distributed as electronic signals, or, as described above, further transmitted optically by a second transmitter array (not shown in the figure), similar to array 100.

Figure 3:
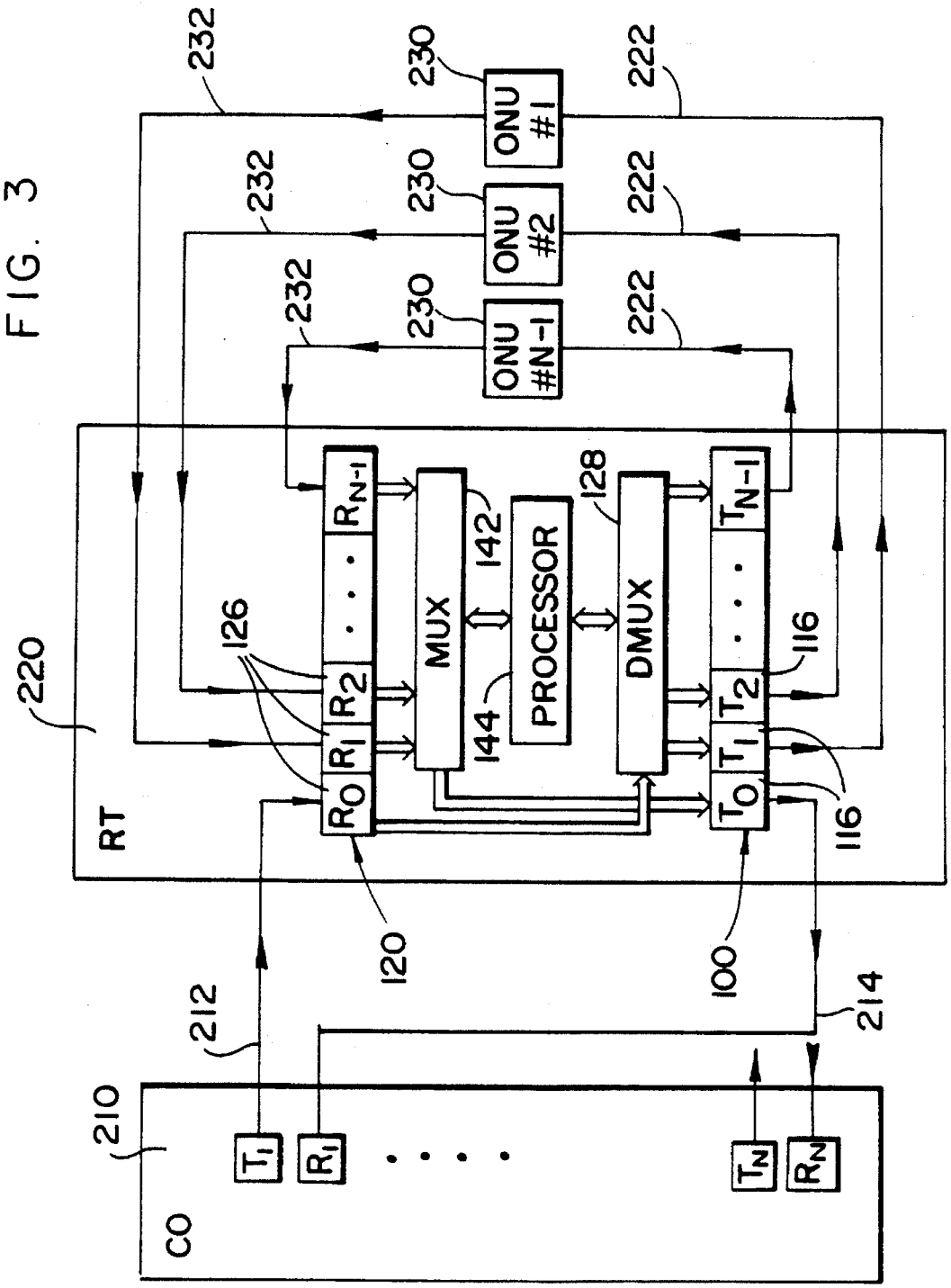
FIG. 3 is a schematic diagram depicting an optical network of the present invention.

A second possible optical network implementation of the one dimensional optical data arrays of this invention is shown in FIG. 3. As was the embodiment of FIG. 2 described above, FIG. 3 is for explanation purposes only, and is not meant to limit the scope of the present invention. A central office 210 shown in FIG. 3 transmits an optical signal on each of M upstream and downstream optical fibers extending therefrom, i.e., as a primary star. Each of the M optical fibers 212 (and 214) link an active remote terminal 220 to the central office (forming a secondary star).

At the remote terminal 220, the downstream signals are received at a first receiver element 126 of one-dimensional optical data receiver array 120. The received signals are transformed electrically and directed to a demultiplexer 128 for demultiplexing. Each packet or time slot separated from the received signal is directed to one of a plurality of lasers 116 in the transmitter laser array 100, based on destination address. N-1 of the N lasers 116 within the array 100 are optically linked by fibers 222 to destination optical network units 230, referred to interchangeably herein as optical transceivers, up to N-1 in number. The optical network units are preferably RITE-Net™ type units.

Upstream light signals launched along optical fibers 232 from each optical network unit 230 are terminated within the remote terminal at array 120. The upstream signals, which may or may not be modulated, are received at the second through $N^{th}$ distinct elements 126 of the receiver array 120 and converted thereat to electronic form. A multiplexer 142 processes and merges the N-1 signals to form a composite upstream signal. The upstream information is converted into light signals which are then transmitted upstream from a transmitter, preferably within transmitter array 100, where transmitter $T_o$ (116) optically transmits the signal into fiber 214 to the central office 210.

The first receiver element 126 of the N-element array 120 may receive the data within frames clocked at a clock rate CR. The data may pass through the multiplexer 128 and form N-1 frames at the same clock rate. The data contained within the signals formed by the demultiplexing, however would be driven by the transmitters at 1/(N-1) of the duty cycle of the downstream optical data signal frames. It should be noted, however, that downstream light signals could alternatively be received at the remote terminal 220 within a discrete and independent optical receiver element and directed therefrom to demultiplexer 128. Such an arrangement would allow data to be output from each element 116 of the transmitter array 100 at rate CR/N, thereby lowering the cost of subscriber electronics. Further, upstream signals could be transmitted to the central office 210 via a transmitter element that is independent of array 100. Such system decisions are made on assessment of cost and complexity.

Figure 4:
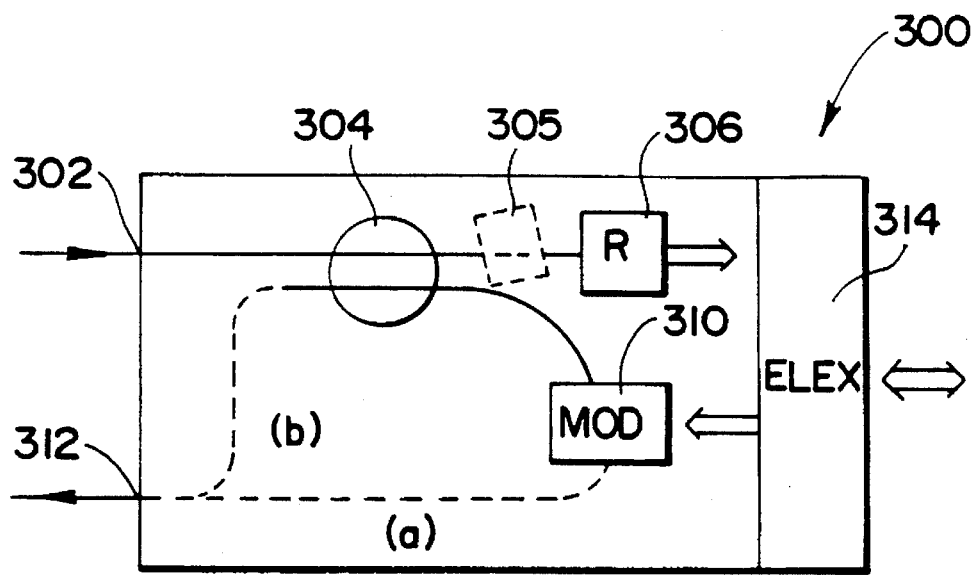
FIG. 4 is a schematic diagram of a RITE-Net™ type optical network unit utilized within the present invention.

FIG. 4 shows a RITE-Net™ based optical network unit 300 which may be utilized in two configurations identified as "a" and "b" in the figure. In the "a" configuration, a light signal received from a remote transmitter at a port 302 is directed to a tap coupler 304. A portion of the received signal is directed by the tap coupler to a receiver 306. An optional wavelength specific filter 305 may be included for identification or diagnostic purposes. Electronics 314 thereat formats the signal for the user and additionally provides upstream data for optical encoding and transfer to the central office. A second portion of the received signal is directed to modulator for remodulation by the upstream electronic data and returned to the central office via port 312. In the "b" mode operation, the modulated portion of the signal is reflected for return to the central office and passed back through the tap coupler 304 before output from port 312. While the FIG. 4 embodiment includes dedicated upstream and downstream fiber, one skilled in the art can appreciate that the embodiment may be easily modified to accommodate a single two-way fiber. Further, while operating in reflective mode, the dotted lines need not exist and the upstream signal could exit port 302.

Figure 1A:
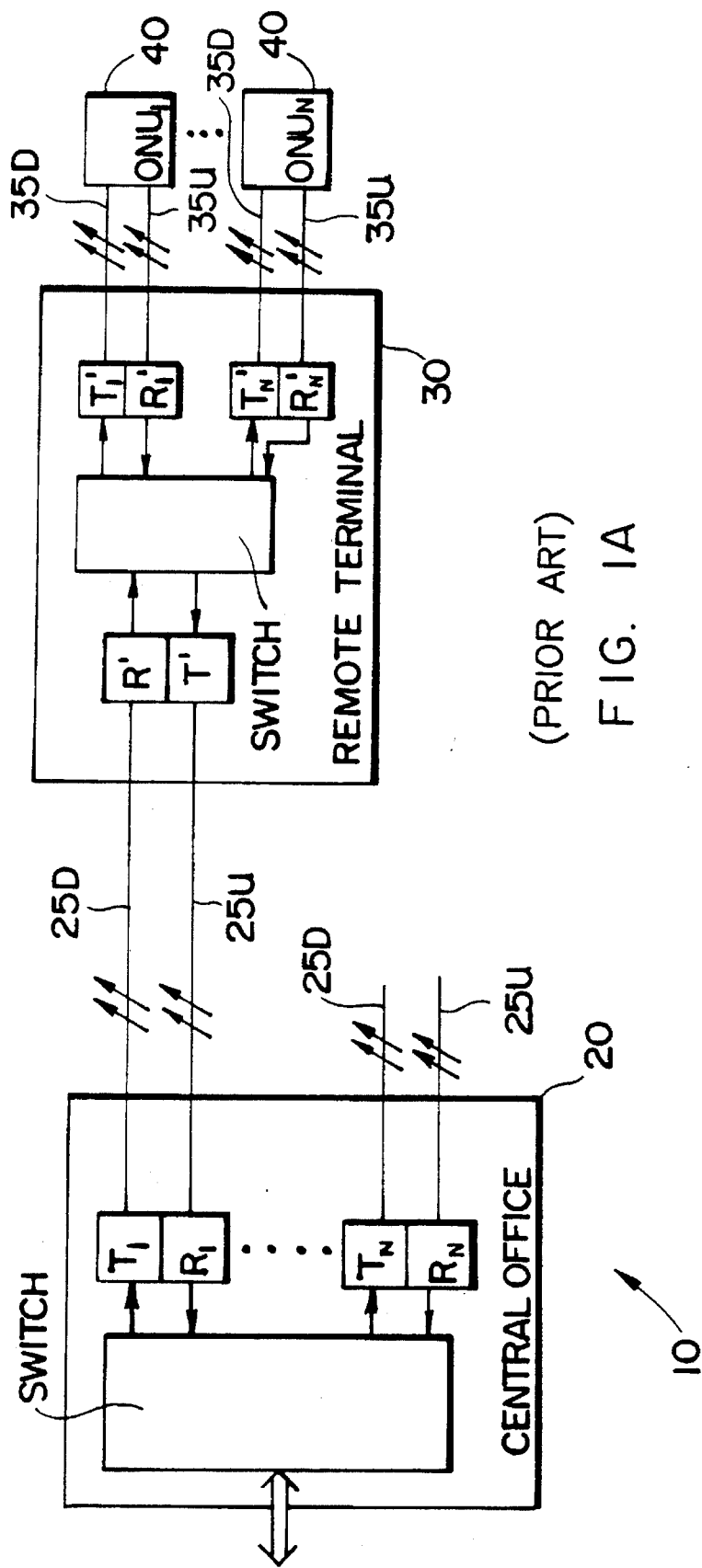
FIG. 1A, 1B, 1C and 1D are schematic diagrams depicting optical networks of the prior art.
Figure 1B:
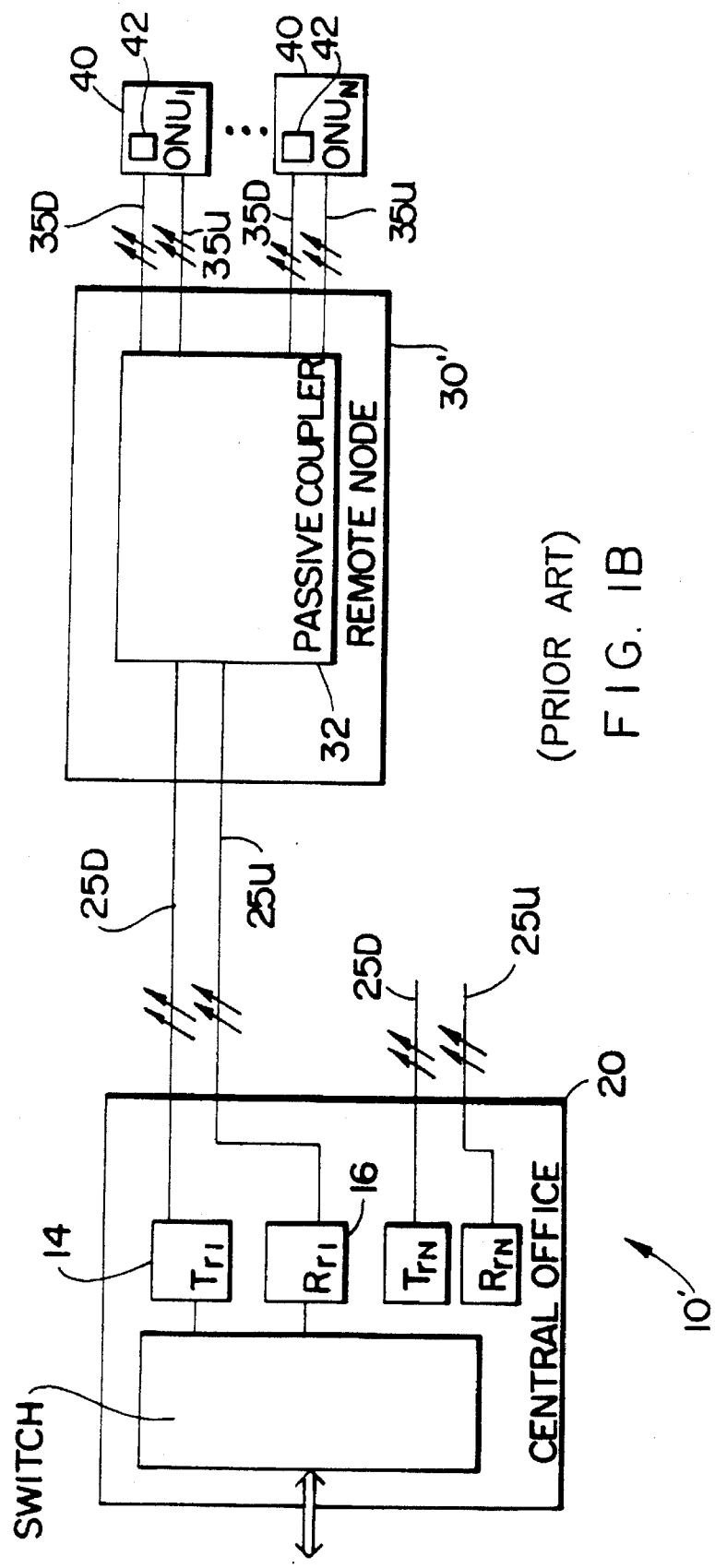
Figure 1C:
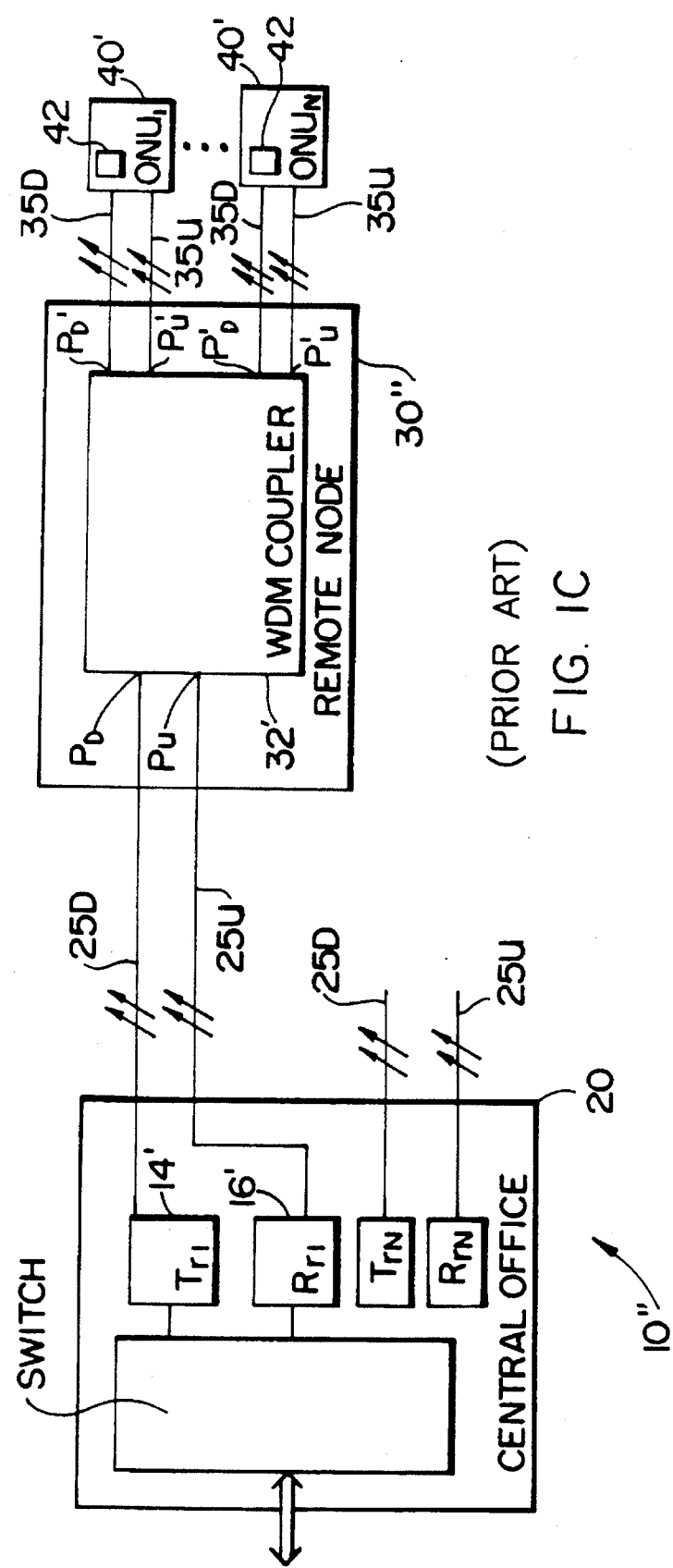
Figure 1D:
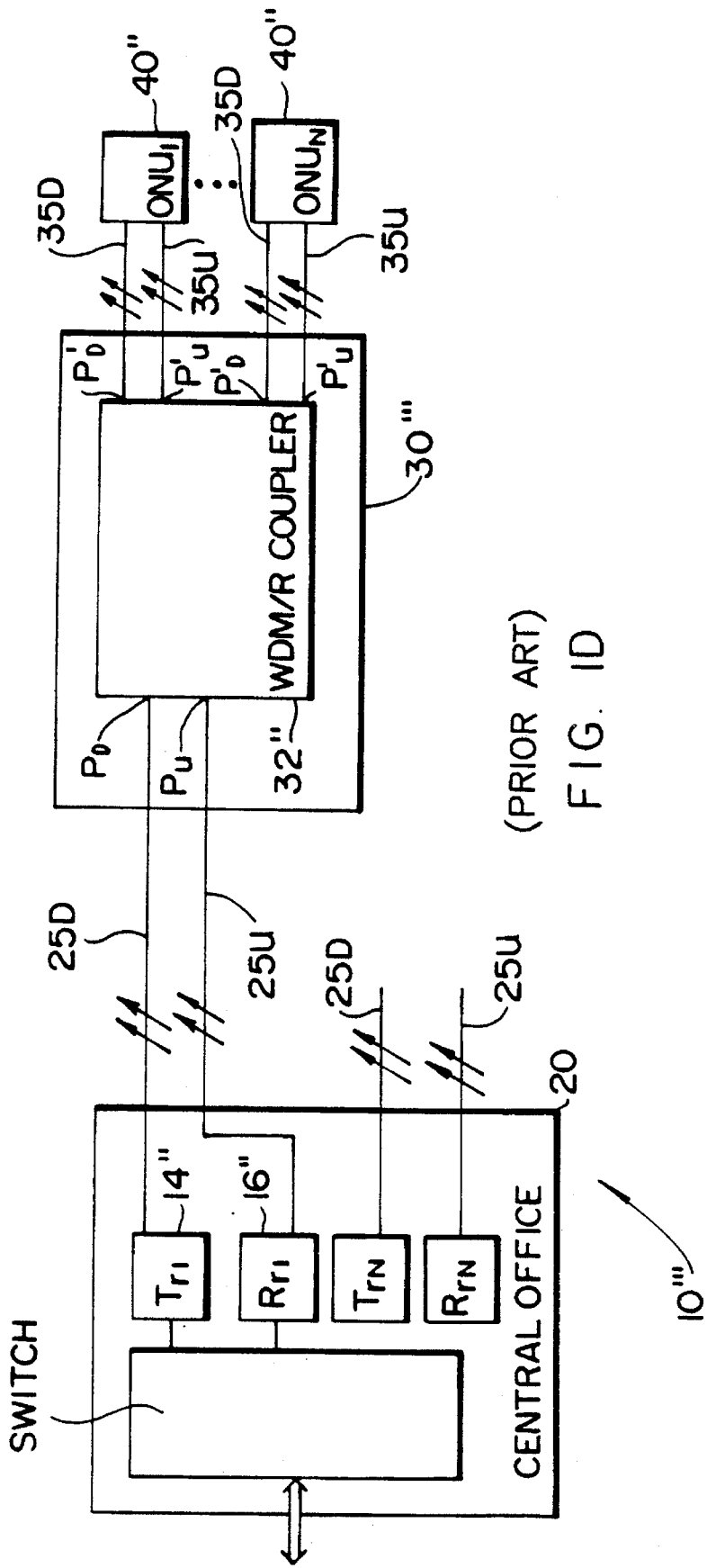

Monitoring the health and integrity of a telephony network is a necessary but laborious task, whether the system is active or passive. In a conventional passive optical network (FIG. 1B), an integrity check may be performed by interrogating each optical network unit in a separate signaling channel. This is accomplished with a physical probe to verify the optical integrity of the loop, which is verified via the subscriber response. In other words, the ONU must operate in response to the signaling probe. Alternatively, in a WDM passive optical network (FIG. 1C) a wavelength selective OTDR can passively probe individual lines 25D and 35D. However, the finite resolution of OTDR reduces its effectiveness in discriminating between an optical break near the optical network unit and an electronic failure within the optical network unit itself. OTDR is most useful in long-length point-to-point links.

In an active network, however, OTDRs cannot be utilized at the central office without some network modification. Several modifications have been proposed, including optical bypasses, e.g., U.S. Pat. No. 5,285,305 to Cohen, et al., commonly owned and incorporated herein by reference. However, similar modifications may be accomplished within an active network to enable OTDR testing from the central office. In particular, a simple wavelength division multiplexer (1×N coupler) overlay, such as that shown in FIG. 3A, may be utilized at the remote terminal which may be interrogated or switched into the network when needed.

Figure 3A:
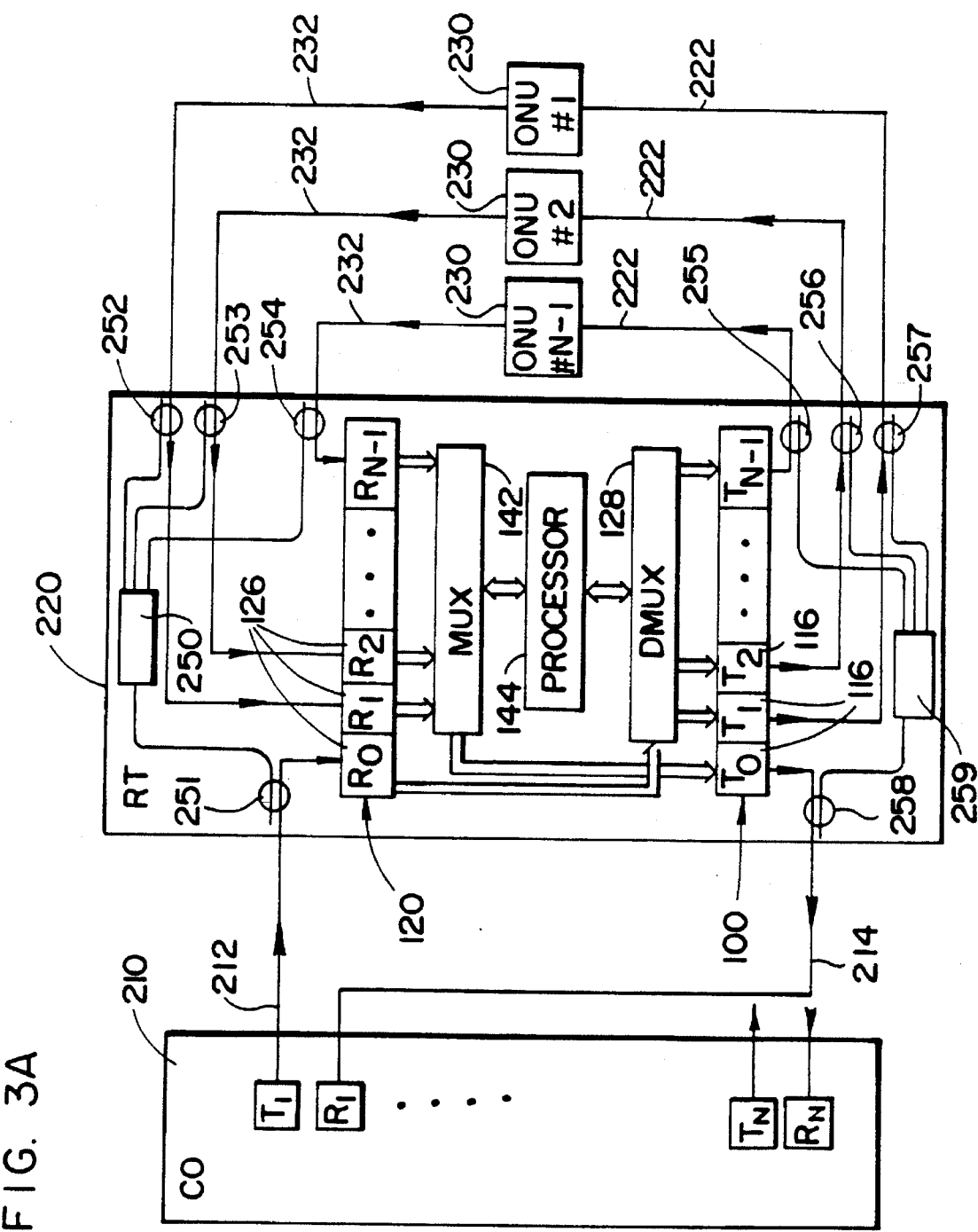
FIG. 3A is a schematic diagram of the optical network of FIG. 3 to which an overlay for fault location has been applied.

Several overlay configurations are available. For instance, a down/up-up/down configuration is shown in FIG. 3A. There, test signals present on fiber 212 may be directed via tap coupler 251 to/from 1×N coupler 250, where the signals may be coupled downstream/upstream to/from the ONUs onto/from upstream fibers 232 via tap couplers 252, 253 and 254. Test signals may be coupled to/from upstream fiber 214 to/from tap coupler 258 to/from a second 1×N coupler 259. 1×N coupler 259 couples the test signal to/from the appropriate ONU.

In a second overlay configuration, tap coupler 251 may couple test signals to/from second 1×N coupler 259, where they can be coupled, through tap couplers 255,256 and 257 to/from fibers 222. Tap coupler 258 may couple test signals to/from fiber 214 to/from first 1×N coupler 250 where the data can be coupled through tap coupler 252, 253 and 254 to/from upstream fibers 232. A third overlay configuration may include a "Dragone" type (WGR) router that replaces both first and second 1×N couplers 250 and 259. The WGR would be connected to the tap couplers and upstream and downstream fibers in a manner similar to that described above.

In a preferred form, each return signal looped-back from each RITE-Net™ optical network unit (whether overmodulated or not) may be utilized as an interrogation signal. That is, each downstream directed signal interrogates the modulator and necessarily checks the optical continuity of the optical circuit. Thus, any break in the loop may be detected at the central office as a matter of course, almost immediately. A lack of response from the ONU over several optical frames, (e.g., 125 μsec.), indicates a line break and the central office takes appropriate action. While detecting a line fault in an active double star network will not aid in determining the exact location of the fault, the assignment of craft personnel and equipment to find the break is expedited since the line fault has been promptly and uniquely identified.

Figure 5:
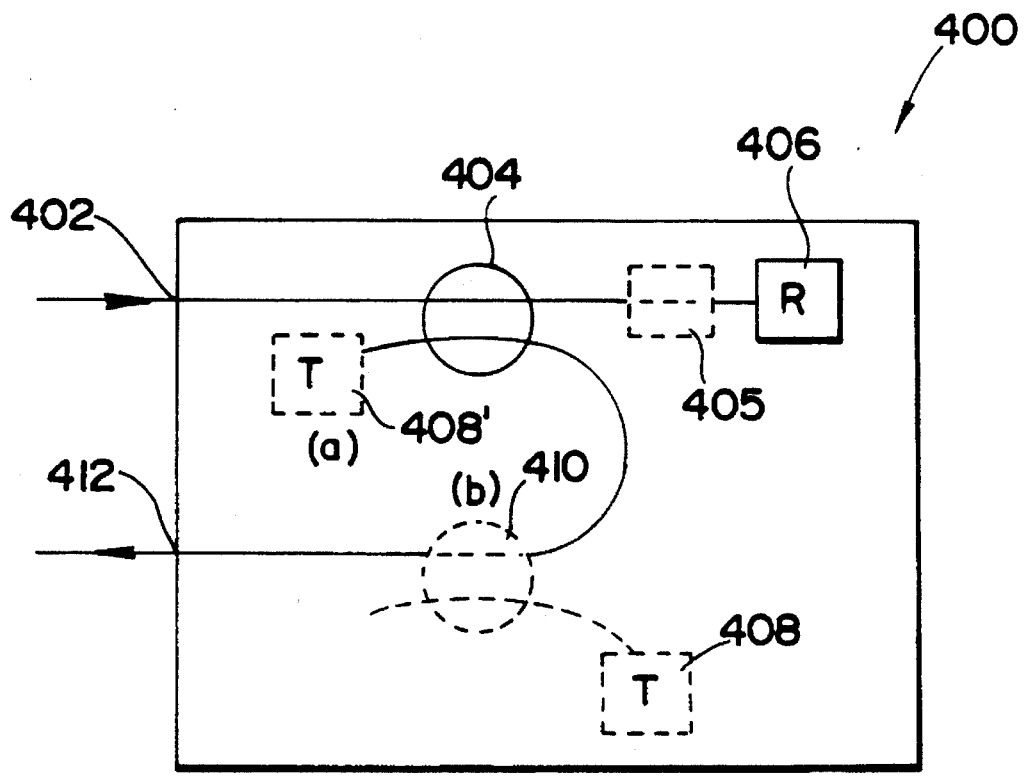
FIG. 5 is a schematic diagram of a variation of a RITE-Net™ optical network unit which may be used herein.

The configuration of FIG. 5 is an optical network unit 400 which may be implemented and may be very useful for extremely long fiber runs. The unit may operate in either an "a" or "b" mode. The optical network unit shown possesses its own laser source (i.e, transmitter 408 or 408') to overcome large attenuation which will tend to occur between the center of the second star and the optical network unit. In "a" mode operation, signals received at input port 402 are directed to coupler 404, which may be a WDM coupler. A portion of the signal is directed from the coupler to receiver 406. Transmitter 408' transmits optically encoded data upstream via coupler 404 through return port 412. If necessary, a filter 405 can isolate receiver 406 from interference from 408'.

In "b" mode operation, coupler 404 directs a return portion of the received signal to second coupler 410. Light from transmitter 408 is also coupled into coupler 410, an output of which is directed to port 412. In such an arrangement, the inclusion of transmitter 408' is not necessary. The use of such ONUs described herein enables the network provider the ability to perform surveillance and measurement on an individual line using transmission tests in lieu of an OTDR as described above. Finally, the use of one-dimensional optical data arrays within active double star networks provides for continuity in the development and implementation of technology to transport switched or broadcast video signals over the network.

While the above-described embodiments took the form of active networks, the scope of the invention is not intended to be limited thereto. For example, a network similar to the network of FIG. 3 is envisioned wherein each optical network unit (i.e., optical transceiver, whether conventional or RITE-Net based) is replaced by an optical coupler which in turn further transmits/receives downstream/upstream optical signals to/from a plurality of optical network units. In today's parlance, the remote terminal is now similar in function to a host digital terminal running conventional passive optical networks.

One-dimensional optical data arrays used within active double star systems provide high capacity and flexibility at low optical component cost, lowering the network cost and simplifying operation system's burdens. Although the invention has been described in connection with an active double star, the invention is not limited to such applications. Those skilled in the art will appreciate that numerous other adaptations and modifications that may be made without departing from the scope and spirit of the invention as set forth in the following claims.

What is claimed is:

1. An optical network, comprising:
   A) a remote terminal including an optical router for routing a plurality of upstream/downstream optical signals arriving at said terminal, said router comprising:
      i) first optical receiver means for concurrently receiving said upstream/downstream optical signals and generating electronic data signals, said first optical receiver means having an N-element array of optical receiver elements forming N independently driven optical links;
      ii) first processing means for processing said electronic data signals; and
      iii) first optical transmitter means for concurrently transmitting upstream/downstream optical signals generated according to said processing, said first optical transmitter means having an M-element array of optical transmitter elements forming M independent optical links; and
   B) an optical transceiver optically linked to said remote terminal, said transceiver comprising:
      i) second optical receiver means for receiving said downstream optical signals;
      ii) second processing means responsive to said second optical receiver means for processing said downstream optical signals; and
      iii) second optical transmitter means responsive to said second processing means for converting upstream data into said upstream optical signals.

2. The optical network defined by claim 1, further including a central office for transmitting/receiving said downstream/upstream optical signals, said central office being optically linked to said remote terminal.

3. The optical network defined by claim 2, wherein said central office includes an N-element array of optical receiver elements enabling N independent optical links.

4. The optical network defined by claim 2, wherein said central office includes an M-element array of optical transmitter elements enabling M independent optical links.

5. The optical network defined by claim 2, wherein said first optical transmitter means includes an K-element array of optical transmitter elements enabling K independent optical links.

6. The optical network defined by claim 2, wherein said first optical receiver means includes an L-element array of optical receiver elements enabling L independent optical links.

7. The optical network defined by claim 2, wherein said transceiver relays a portion of said downstream signal to provide said upstream signal.

8. The optical network defined by claim 7, wherein said remote terminal includes an I-element receiver array of optical receive elements enabling I independent links.

9. The optical network defined by claim 7, wherein said remote terminal includes a J-element transmitter array of optical transmitter elements enabling J independent links.

10. The optical network defined by claim 7, wherein said central office includes means for performing an operations system task of network monitoring.

11. The optical network defined by claim 10, wherein said means for performing said network monitoring performs a continuity check of said upstream and downstream optical paths.

12. The optical network defined by claim 7, wherein said router includes a wavelength division multiplexer which overlays said router and said first processing means, providing an optical link between said central office and said transceiver.

13. The optical network defined by claim 7, wherein said upstream signal is overmodulated with upstream data before it is relayed.

14. The optical network defined by claim 7, wherein said optical transceivers include an independent light source.

15. The optical network defined by claim 2, wherein said remote terminal is linked to a passive optical network.

16. The optical network defined by claim 1, wherein said optical transceiver provides said upstream signal by relaying a portion of said received downstream signal.

17. The optical network defined by claim 16, wherein said upstream signal is overmodulated with upstream data before it is relayed.

18. The optical network defined by claim 16, wherein said optical transceivers include an independent light source.

* * * * *